(12) United States Patent
Repetto et al.

(10) Patent No.: US 7,477,453 B2
(45) Date of Patent: Jan. 13, 2009

(54) OPTICAL SYSTEM FOR IMAGE TRANSMISSION, PARTICULARLY FOR PROJECTION DEVICES OF THE HEAD-MOUNTED TYPE

(75) Inventors: Piermario Repetto, Orbassano (IT); Stefano Bernard, Orbassano (IT); Davide Capello, Orbassano (IT); Roberto Finizio, Orbassano (IT); Luca Liotti, Orbassano (IT); Cosimo Carvignese, Orbassano (IT); Denis Bollea, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 119 days.

(21) Appl. No.: 11/645,632

(22) Filed: Dec. 27, 2006

(65) Prior Publication Data

US 2007/0153395 A1    Jul. 5, 2007

(30) Foreign Application Priority Data

Dec. 29, 2005  (EP) .................................. 05425939

(51) Int. Cl.
*G02B 27/14* (2006.01)
(52) U.S. Cl. ....................................... 359/631; 359/630
(58) Field of Classification Search ......... 359/630–634; 348/115; 345/7, 8; 349/11, 13
See application file for complete search history.

(56) References Cited

U.S. PATENT DOCUMENTS

| | | | |
|---|---|---|---|
| 5,453,877 A | 9/1995 | Gerbe et al. | |
| 5,701,202 A | 12/1997 | Takahashi | |
| 5,715,377 A | 2/1998 | Fukushima et al. | |
| 5,880,888 A * | 3/1999 | Schoenmakers et al. | .... 359/631 |
| 5,886,822 A | 3/1999 | Spitzer | |
| 6,023,372 A | 2/2000 | Spitzer et al. | |
| 6,091,546 A | 7/2000 | Spitzer | |
| 6,337,776 B1 | 1/2002 | Kamo | |
| 6,618,099 B1 | 9/2003 | Spitzer | |
| 6,657,602 B2 | 12/2003 | Endo et al. | |
| 6,903,876 B2 * | 6/2005 | Okada et al. | ................ 359/633 |
| 2004/0027475 A1 | 2/2004 | Kamo | |

FOREIGN PATENT DOCUMENTS

| | | |
|---|---|---|
| EP | 2 638 242 | 4/1990 |
| EP | 1 312 968 | 5/2003 |
| JP | 2000-105338 | 4/2000 |

\* cited by examiner

*Primary Examiner*—Hung X Dang
*Assistant Examiner*—Joseph Martinez
(74) *Attorney, Agent, or Firm*—Nixon & Vanderhye P.C.

(57) ABSTRACT

An optical system for image projection, particularly for projection devices of the "head-mounted" type, includes a display, an optical system for focusing an image formed by the display, and a light guide having an extended body, with two opposite, longitudinal, plane and parallel faces, and opposite ends which define first reflecting surface for coupling into the light guide and second reflecting surface for extracting the image from the light guide. Each light ray which propagates through the light guide undergoes at least three internal total reflections on the parallel plane faces of the light guide. At least a surface of the focusing optical system is a portion of a surface free of rotational symmetry axes. Moreover, the two reflecting surfaces of the light guide are portions of surfaces free of rotational symmetry axes. Finally, the inlet pupil of the light guide coincides with the outlet pupil of the focusing system.

14 Claims, 9 Drawing Sheets

Figure 8

OPTICAL SYSTEM FOR IMAGE TRANSMISSION, PARTICULARLY FOR PROJECTION DEVICES OF THE HEAD-MOUNTED TYPE

BACKGROUND OF THE INVENTION

The present invention relates to an optical system for image transmission, particularly for projection devices of the "head-mounted" type.

The projection devices of the "head-mounted" type have the purpose of presenting an image, for example generated by a microdisplay, superimposed to a background, so that an observer can see the image generated by the microdisplay without distracting his own attention from the background.

Some solutions are already commercially available which present to an observer the image generated by a microdisplay.

The MicroOptical Corp. proposes the solution diagrammatically depicted in FIG. 1 and protected for example by the patents U.S. Pat. No. 5,715,377, U.S. Pat. No. 5,886,822, U.S. Pat. No. 6,023,372, U.S. Pat. No. 6,091,546 and U.S. Pat. No. 6,618,099.

In this solution, the image shown by the microdisplay is projected by means of a light guide within the user's field of view. The input and output surfaces of the guide are substantially spherical and therefore endowed with optical power, and the propagation therein does not occur by internal total reflection on the side surfaces of the guide, but by simple direct propagation: therefore said guide substantially acts as a simple lens capable of focusing the microdisplay in a virtual image placed at the desired distance.

The choice of the direct propagation within the light guide forms the main constraint of the optical system described: in fact, in this configuration, each reflection on the walls of the light guide can originate spurious images which degrade the quality of the presented image. Therefore, the image projection with a resolution higher than VGA (640×480 pixels) within fields of view higher than 16° requires the use of light guides with side walls very large and therefore cumbersome.

FR 2.638.242 (Thomson-CSF) describes a system according to the pre-characterizing part of the appended claim 1. In such a system (see FIG. 2), the propagation occurs by internal total reflection within the light guide, with a consequent decrease of the thickness with respect to the MicroOptical solution described above. Coupling and decoupling into the light guide takes place by means of two partly or totally reflecting parabolic surfaces, placed at the ends of the light guide. Although more compact with respect to the preceding one, this optical solution suffers from a substantial limitation of the field of view presented to the user with values lower than 10°, due to the aberrations resulting from the use of greatly off-axis portions of the parabolic surfaces.

U.S. Pat. No. 5,701,202 (Olympus Optical Co., Ltd.) describes an optical solution, diagrammatically depicted in FIG. 3, based on the use of a prism formed by complex, asymmetrical and non rotational surfaces. The image shown by the microdisplay is coupled and decoupled into the prism according to the optical path shown in the figure, and each ray undergoes a series of reflections and refractions on the complex surfaces which focus a virtual image projected within the user's field of view. The see-through configuration is reached through the addition of an optical element which compensates the distortions introduced by the complex surfaces.

In the disclosed configuration the coupling of the light rays into the prism occurs by direct propagation (as in the MicroOptical configuration) and not by reflection (as in the Thomson configuration): as it can be seen in FIG. 3, due to this choice, the prism must have a length approximately twice the thickness. It follows that, to reach a compact configuration and see-through features, there are only two alternatives:

1) a microdisplay worn on the user's eyes (as in the case depicted in FIG. 3) with a consequent increase of the total front bulkiness of the system;

2) a microdisplay placed in the temporal zone (as in the MicroOptical configuration) with a consequent increase of the thickness of the light guide up to at least 4 cm, in order to allow the image delivery to the user's eye.

In both the configurations, the bulkiness seems to be excessive.

U.S. Pat. No. 6,657,602 (Minolta Co., Ltd.) describes a binocular optical system based on the use of prisms with asymmetrical and non rotational complex surfaces (as in the case of the Olympus patent described above), wherein the residual aberrations are compensated through a pre-distortion of the image shown by the microdisplay. Also in this case, the image rays encounter the prism surfaces which, by means of consecutive reflections and refractions according to what approximately depicted in FIG. 4, focus and project a virtual image within the user's field of view. This configuration, however, presents the same drawbacks of the configuration described above, not being suitable to obtain optical systems with a reduced bulkiness.

SUMMARY OF THE INVENTION

The object of the present invention is to provide a display device of the "head-mounted" type which allows to overcome the drawbacks of the known solutions.

According to the present invention, such a aim is attained by an optical system having the features forming the subject of the main claim.

BRIEF DESCRIPTION OF THE DRAWINGS

The present invention will now be described in detail with reference to the enclosed drawings, which are given by mere way of not limitative example, wherein:

FIG. 8 represents an alphanumeric matrix shown as a non pre-distorted image (A) with a corresponding image presented to the user (B), as well as an alphanumeric matrix presented as a pre-distorted image (C) with a corresponding image presented to the user (D)

DETAILED DESCRIPTION OF THE INVENTION

Figure 1:
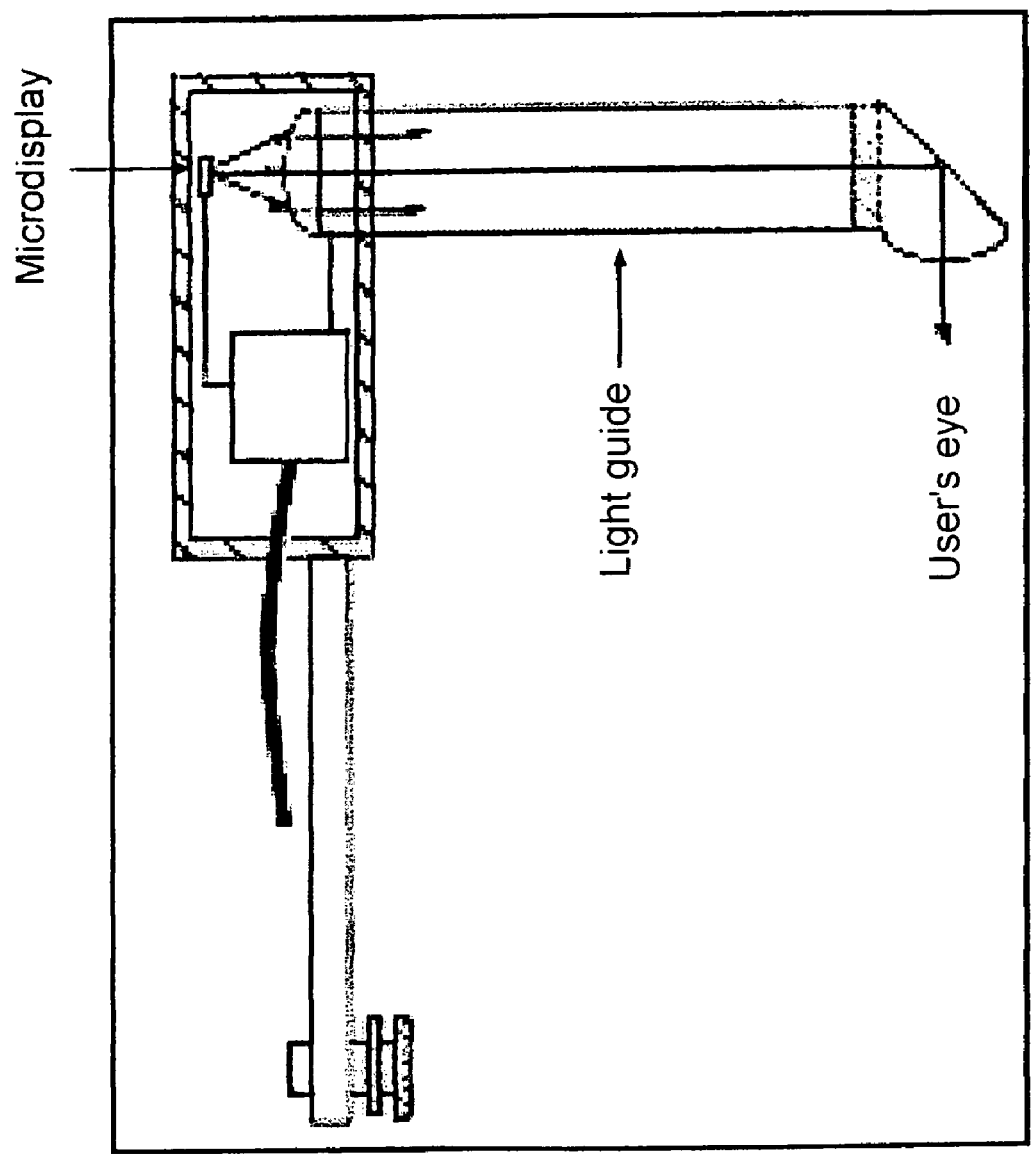
FIG. 1 is a diagrammatic view of a device according to U.S. Pat. No. 6,618,099 by MicroOptical Corp.
Figure 2:
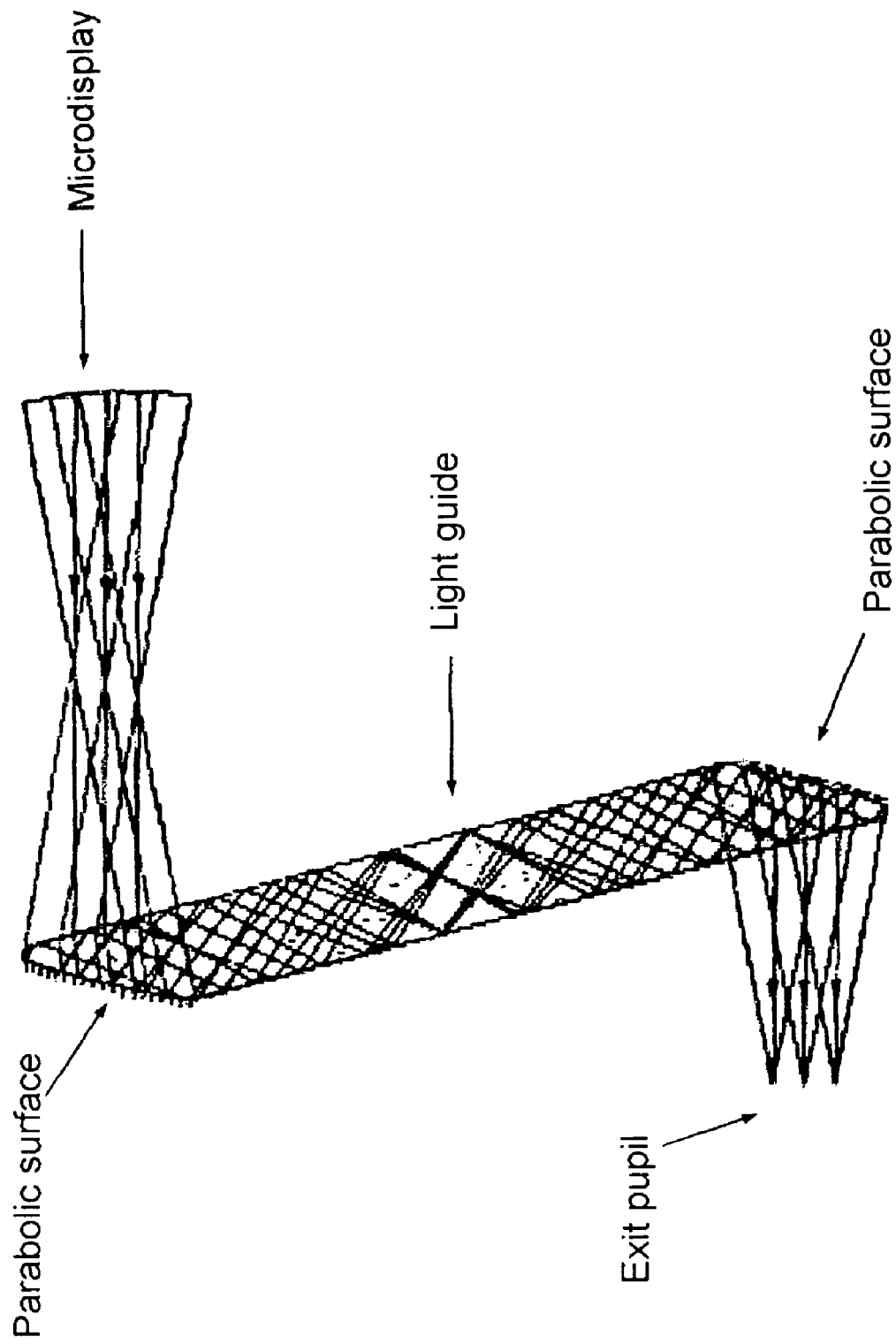
FIG. 2 is a diagrammatic view of a device according to FR 2.638.242 by Thomson-CSF.
Figure 3:
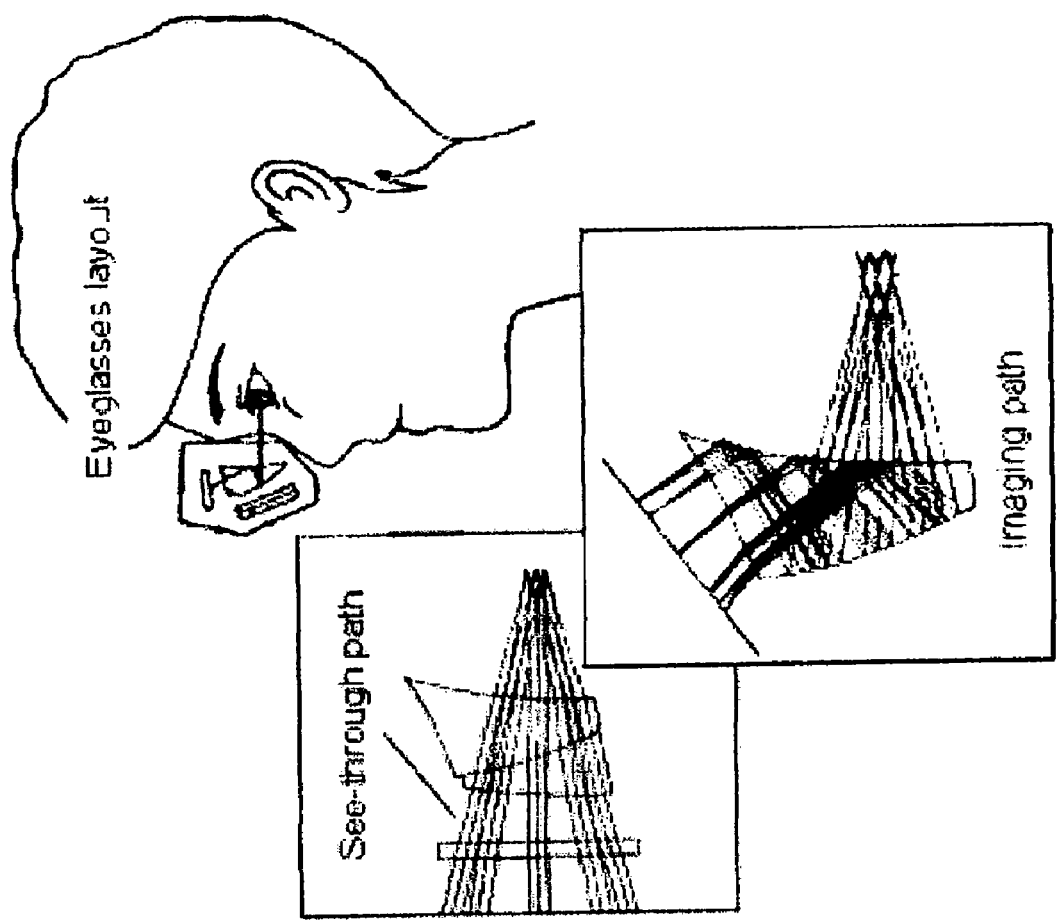
FIG. 3 is a diagrammatic view of a device according to U.S. Pat. No. 5,701,202 by Olympus Optical Co., Ltd.
Figure 4:
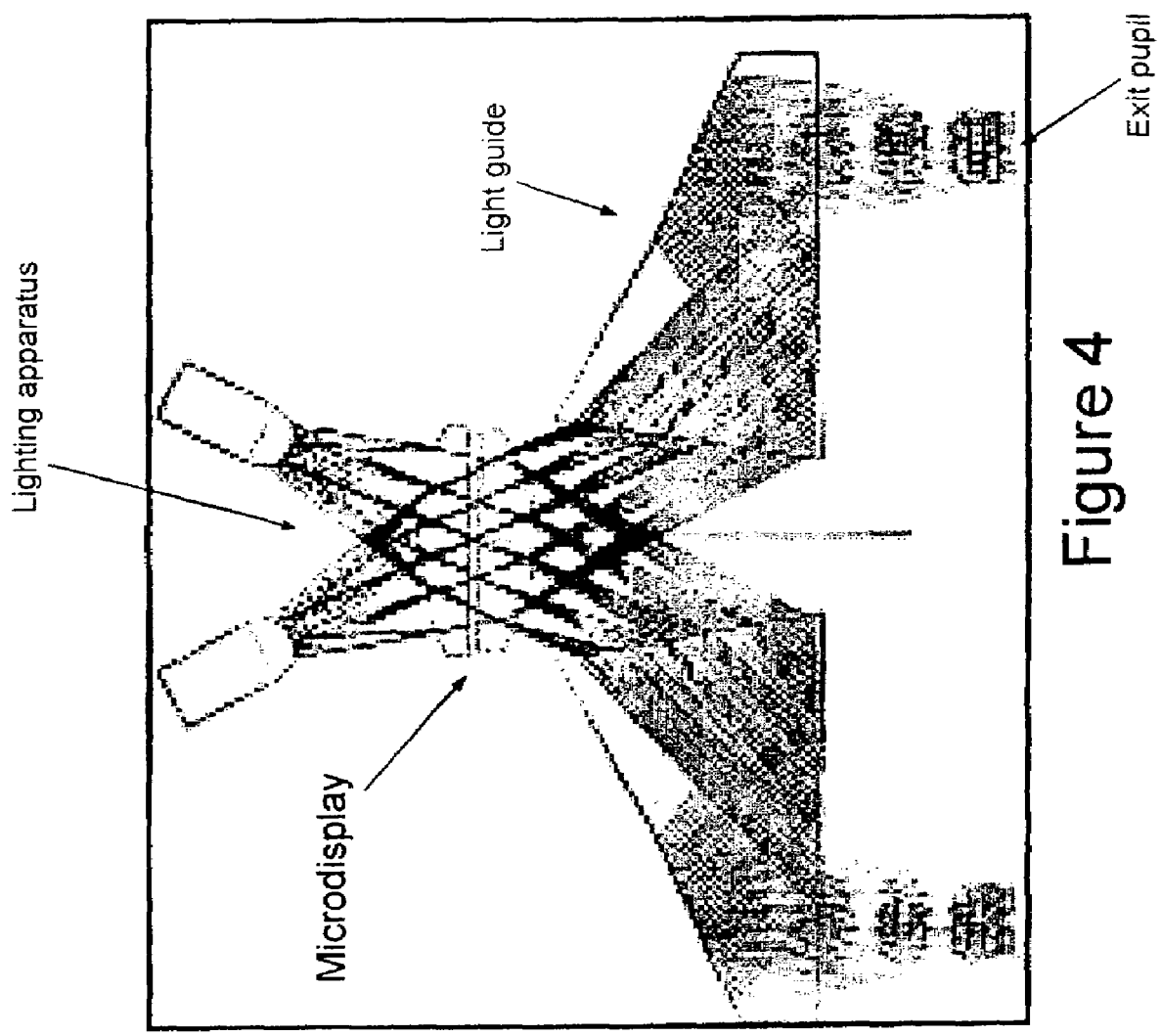
FIG. 4 is a diagrammatic view of a device according to U.S. Pat. No. 6,657,602 by Minolta Co., Ltd.
Figure 5:
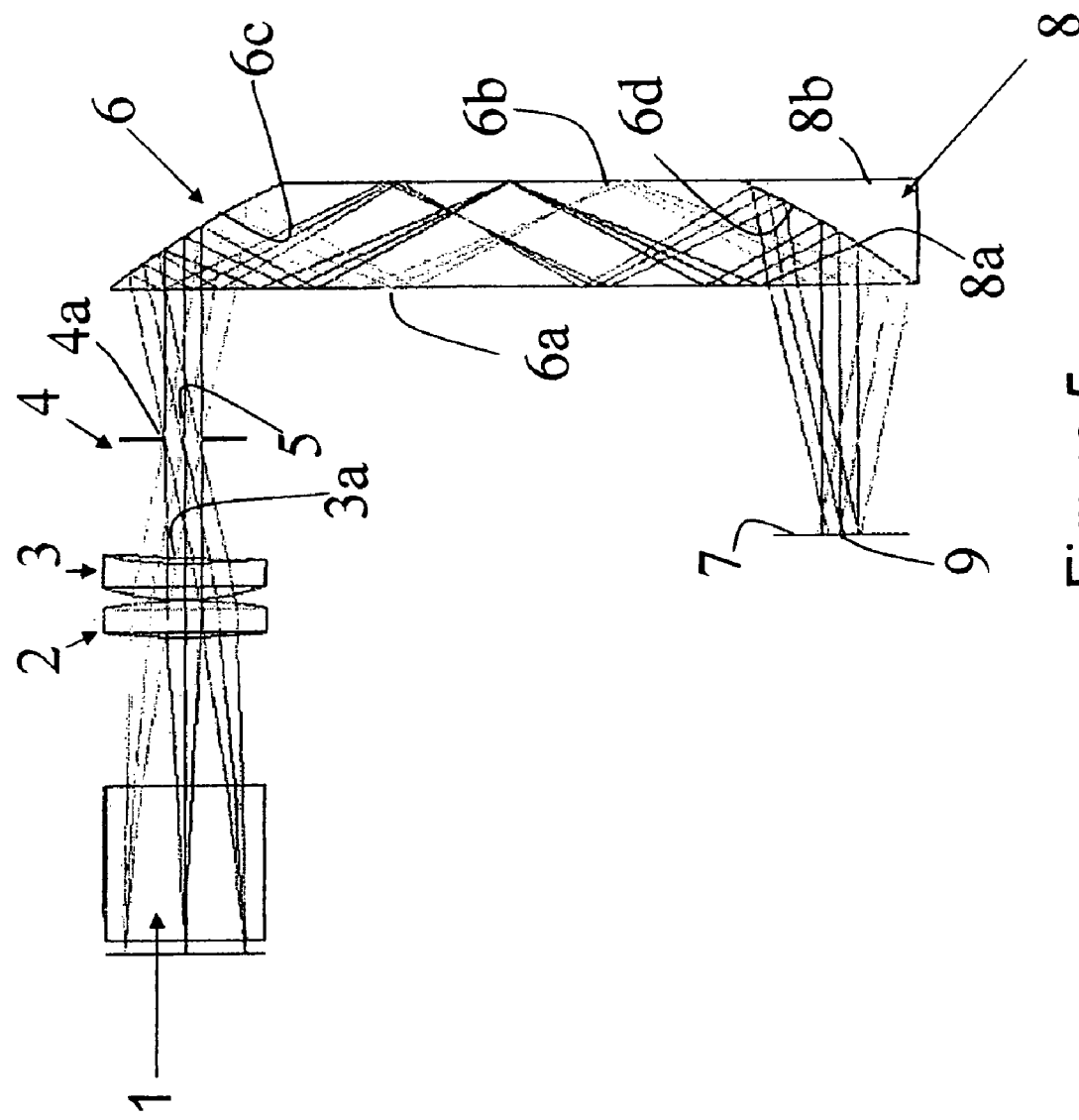
FIG. 5 is a diagrammatic view of the optical system of the present invention, wherein optical paths of three representative sources are shown.

Referring to FIG. 5, a microdisplay 1 forms the image source to be displayed. The microdisplay 1 is of the known "reflection" type, but it could also be of any other type (transmissive LCD, CRT, OLED, etc.). Therefore details relating to the conformation and structure of the display are not shown herein, as they are feasible in any known way and they do not concern, independently considered, the spirit of the present invention. The removal of these details from the drawings also renders these more immediately comprehensible.

A pair of lenses 2, 3 focuses the image created by the microdisplay 1 into a virtual image placed at an infinite distance. The first lens 2 is of a biconvex type with a radial symmetry while the second lens 3, biconvex as well, presents a polynominal aspherical output surface 3a with no rotational symmetry. Such surface is described by the following equation:

$$z(r) = \frac{cr^2}{1 + \sqrt{1 - (1+k)c^2 r^2}} + \sum_{i=1}^{N} A_i E_i(x, y) \quad (1)$$

wherein c and k represent the coefficients of the conical component of the surface (curvature and conicity, respectively), N is the number of the polynominal coefficients in the series, $A_i$ is the coefficient of the polynominal $i^{th}$ $E_i$ term in the form of the product of a sequence of powers of x and y (namely x, y, $x^2$, $y^2$, xy, $x^2 y$, $xy^2$ and so on).

A focusing system as the one formed by the two lenses 2, 3 presents, downstream of said lenses, a region within which the observer's eye must be hypothetically located so as to simultaneously perceive the whole field of view. Said space region is defined as "eye motion box". The maximum section of said eye motion box performed through planes perpendicular to the optical axis is called exit pupil. If said maximum section coincides with the last optical surface of said focusing system, then the system is called "non-pupil-forming"; if said surface is downstream of the last surface of said optical system, the system is called "pupil-forming", the distance between said surface and said exit pupil is called "eye-relief" and represents the optimal distance at which the observer has to place the eye for maximizing the motion possibility thereof and maintaining the total sight of the field of view.

The focusing system formed by the two lenses 2, 3 is "pupil-forming": the exit pupil 5 of said system is not coincident with the last optical surface 3a, but it is spaced downstream of it. A diaphragm 4 is arranged in correspondence with said exit pupil 5 and has an opening 4a with an extension substantially like that of the exit pupil 5, thus reducing the parasitic light rays and the aberrations.

The rays which pass beyond the diaphragm 4 reach a light guide 6, having an extended body of an appropriate material with an index of refraction higher than one (typically glass with a high purity, for example BK7 with an index of refraction n=1,5168 at 550 nm) showing two opposite, longitudinal, plane and parallel faces 6a, 6b and two end surfaces 6c, 6d forming two aspherical mirrors, with an aspherical polynominal surface free of rotational symmetry, the first of which is completely reflecting and suitable for coupling the rays of light coming from the focusing system 2, 3 into the light guide 6, so that they propagate therein through an internal total reflection, and the second partly reflecting and suitable for playing a double function:

1) decoupling the light rays propagating within the light guide 6 and directing them towards the eye 7 of the user;

2) allowing the rays coming from the background (which is placed on the right of the light guide 6 with reference to the FIG. 5) to reach the eye 7 of the user, therefore not obstructing his field of view.

Such reflecting surfaces 6c, 6d are of the same type of the surface 3a of the second lens 3 of the focusing system and disclosed by the equation (1) shown above.

A further, substantially prism-shaped optical element 8 is arranged in contact with the second reflecting surface 6d; said optical element shows:

an internal surface 8a with a profile coincident with said second reflecting surface 6d of the light guide, an external surface 8b such that, once the internal surface 8a has been stuck to the second reflecting surface 6d of the guide 6, it results coplanar and flush with the external plane face 6b of the light guide 6.

In this way, a double result is obtained:

1) the rays coming from the background cross an optical system with a null focal power, thus ensuring the "see-through" features.

2) The rays which propagate into the light guide encounter the reflecting surface 6d anyway, operable to decouple them from the light guide.

For each optical system, together with the outlet pupil, it is possible to define another surface typical of the inlet pupil, perpendicular to the optical axis and which represents the surface which is necessarily intersected by the rays reaching the opposite end of the optical system. Any ray which enters the optical system from such directions so as not to intersect the inlet pupil will not reach the opposite end of said optical system, but will end its way against the internal walls.

The distance of the light guide 6 from the focusing system 2, 3 is such that its own inlet pupil, i.e. the surface necessarily crossed by all the collimated beams which said guide will project within the user's field of view, is coincident with the outlet pupil 5 of the focusing optical system: in this way, the optical coupling between the two segments of the optical chain is optimized, with a consequent increase of the whole system effectiveness.

Figure 6:
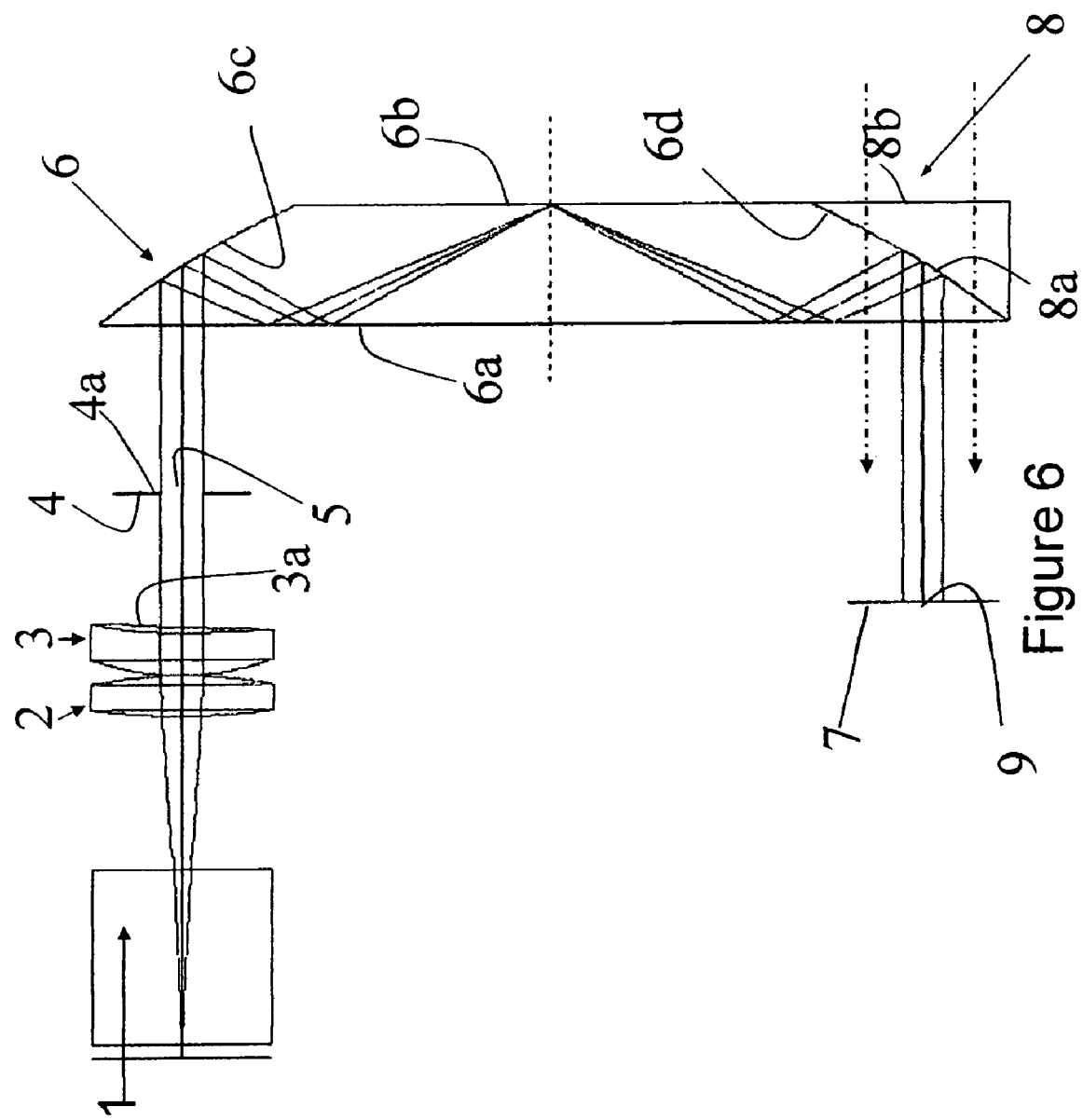
FIG. 6 is a diagrammatic view of the optical system of the present invention, wherein the optical path of the central point of the display is shown.

In FIG. 6, by way of example, the optical path of the beam of the rays emitted from the central point of the microdisplay 1 is shown. The focusing optical system 2, 3, by generating a virtual image placed at an infinite distance, transforms the diverging beam of the rays emitted from a point into a collimated beam, with a length equal to the exit pupil 5. The light guide 6 is designed so as to ensure that the entering collimated beam is reflected by the first reflecting surface 6c, propagates through the light guide with three reflections, is reflected by the second reflecting surface 6d and exits from the guide 6. The afocalization of the light guide, with a consequent constancy of the dimensions of the exit pupil, like those of the entrance pupil (coincident, in turn, with the exit pupil of the focusing optical system) is ensured by the symmetry with respect to the median point of the guide of said optical path.

The light guide 6 thus formed creates the image of the inlet pupil in 9, that is at a distance (for example of about twenty millimetres) from the eye of the observer 7, therefore resulting suitable for applications for glasses.

The use of the polynominal surfaces allows the reduction of all the main aberrations; in order to ensure a good quality of the end image, however, it is opportune to operate the pre-distortion of the image shown by the microdisplay 1, for the purpose of compensating the residual distortion of the optical system.

Figure 7:
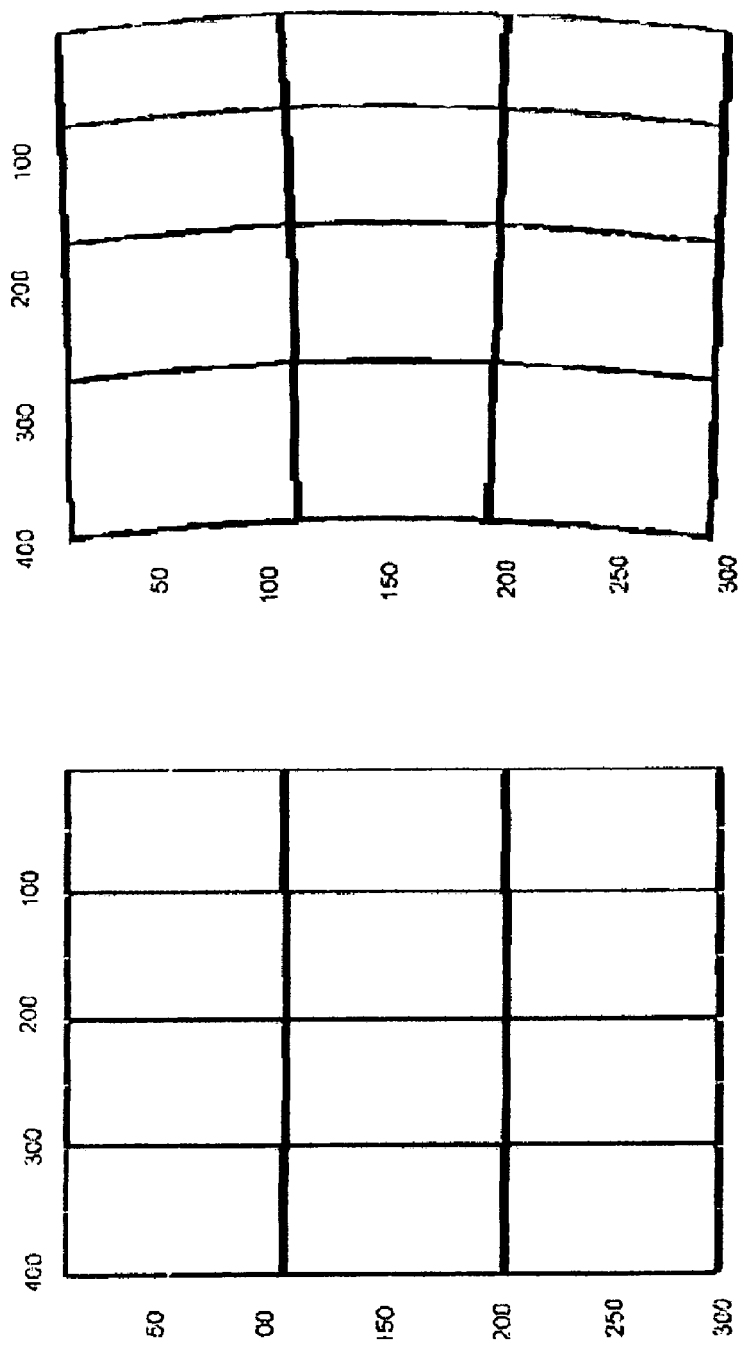
FIG. 7 represents the image of a non distorted (A) and a pre-distorted (B) grids for compensating the residual aberration of the optical system.

Considering a Cartesian reference system (i, j) of the non-distorted image, FIG. 7a, and (x, y) of the distorted image, FIG. 7b, the transformation of coordinates which correlates the two reference systems is of the type:

$$x = j \pm \gamma i$$

$$y = i + \beta i^2 + \alpha (j - M/2)^2$$

wherein:
- $\gamma$: controls the inclination of the horizontal lines
- $\beta$: controls the factor of horizontal restaggering
- $\alpha$: controls the curvature of the vertical lines.

By means of the inverse relations, it is possible to compute the pre-distorted image shown by the display, by associating to each point of said image a point of the original image, thus avoiding the existence of zones of the microdisplay without an information to be projected. Mathematically, it is a matter of expressing the coordinates (i, j) of a point of the original image in terms of coordinates (x, y) of the corresponding point of the pre-distorted image:

$$j = x - \gamma i$$

$$i = \frac{-B \pm \sqrt{B^2 - 4AC}}{2B}$$

wherein:

$$A = \alpha \gamma + \beta$$

$$B = \alpha M \gamma - 2\alpha x \gamma + 1$$

$$C = \alpha x^2 + \alpha M^2/4 - \alpha M x - y$$

Figure 8:
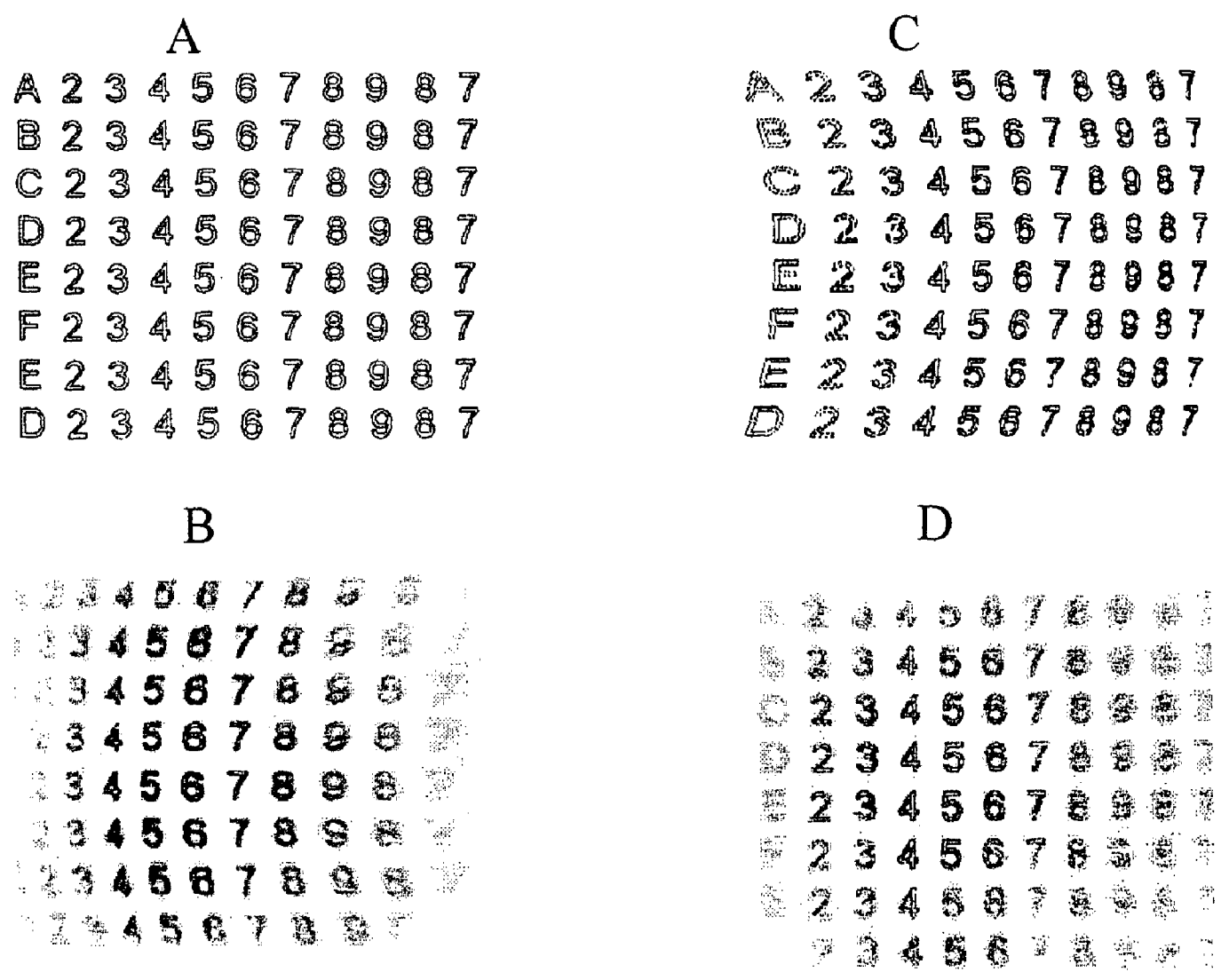

FIG. 8A is the original image projected by the microdisplay, formed by a sequence of alphanumerical characters. FIG. 8B has been obtained with a simulation carried out with a non-sequential ray-tracing software. FIG. 8C is the pre-distorted image projected by the microdisplay and FIG. 8D is the resulting image. It can be seen that the quality of the image is very good, except for some residual aberrations which cause a slight defocus in the horizontal direction.

Figure 9:
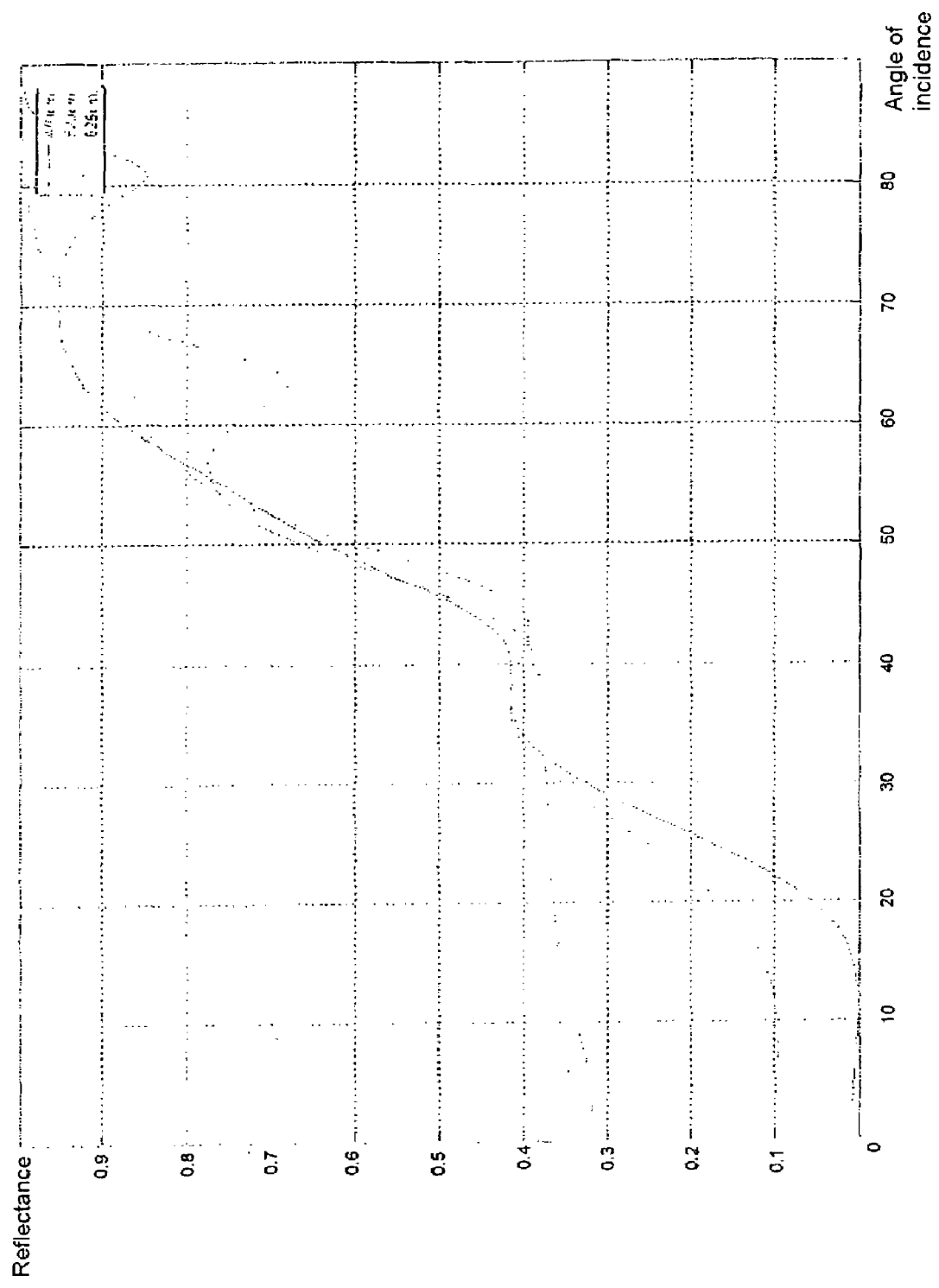
FIG. 9 represents the reflectance of a dielectric reflecting coating as a function of the angle of incidence, for three characteristic wavelengths of the visible spectrum.

The reflecting properties of the two surfaces 6c, 6d can be obtained with the deposition of a layer of metal material (Ag, Al, Cr), whose thickness will determine the reflectance. Alternatively, at least one of the two surfaces can be coated with at least a partly reflecting multilayer, formed by a sequence of at least two superimposed layers of different dielectric material (for example $MgF_2$, SiO, $SiO_2$, $TiO_2$, $Ta_2O_5$, $Al_2O_3$). The use of this solution results particularly advantageous for the partly reflecting surface, since it substantially decreases the absorption losses which instead characterize the partly reflecting coatings obtained with metal material layers. A further advantage consists in the possibility of controlling the reflectance of the multilayer as a function of the angle of incidence, thus allowing to keep it at optimal values for the angles of incidence characteristic of the rays associated with the image which propagates in light guide, and, if necessary, at very low values for the rays associated with the background, with a consequent optimization of the see-through features and a reduction of the spurious images. By way of example, FIG. 9 represents the reflectance as a function of the angle of incidence for three representative wavelenghts of the visible spectrum of a multilayer coating formed by seven alternating layers of $Ta_2O_5$ and $SiO_2$ deposited on BK7 glass, and the presence of the additional optical element (always made of BK7 optical glass) for the obtainment of the see-through features taken into account. The reflectance is maintained at values close to 0.4 for the angular interval between 32° and 45°, namely the interval of the angles of incidence on the second reflecting surface of the rays emitted by the microdisplay and which propagate in the light guide.

Obviously, further without prejudice to the principle of the invention, construction details and embodiments could widely vary with respect to what has been described and shown, without leaving the ambit of the invention, as it is defined by the following claims.

What is claimed is:

1. Optical system for image projection, particularly for projection devices of the "head-mounted" type, said system including:
   a display,
   an optical system for focusing an image formed by the display,
   a light guide having an extended body, with two opposite, longitudinal, plane and parallel faces, and opposite ends defining:
   a first reflecting surface for coupling into light guide, for reflecting through the light guide the light radiation exiting from said focusing optical system, and a second reflecting surface for extracting the image from the light guide,
   said light guide being shaped such that each light ray propagating into the light guide undergoes at least three internal total reflections on the parallel plane faces of said light guide;
   wherein:
   at least a surface of said focusing optical system is a portion of a surface free of rotational symmetry axes;
   the two reflecting surfaces of the light guide are portions of surfaces free of rotational symmetry axes;
   the inlet pupil of the light guide coincides with the outlet pupil of the focusing system;
   and wherein said focusing system is operable to perform a pre-distortion of the image formed by the display, to substantially compensate the residual aberrations introduced from the reflecting surfaces of the light guide;
   and wherein the focusing system is designed such that the coordinates i, j of each point of the image provided by the display are transformed in coordinates x, y such as:

$$x = j \pm \gamma i$$

$$y = i + \beta i^2 + \alpha (j - M/2)^2$$

wherein:
   $\gamma$: is a parameter which controls the inclination of the horizontal lines,
   $\beta$: is a parameter which controls the factor of horizontal restaggering,
   $\alpha$: is a parameter which controls the curvature of the vertical lines.

2. Optical system according to claim 1, wherein said focusing optical system includes a first lens of a biconvex type with a radial symmetry and a second lens, biconvex as well, placed downstream of the first lens, with reference to the direction of the light radiation, which presents an output surface constituted by a surface portion free of rotational symmetry axes.

3. Optical system according to claim 1, wherein said focusing optical system has a surface described by the following equation:

$$z(r) = \frac{cr^2}{1+\sqrt{1-(1+k)c^2r^2}} + \sum_{i=1}^{N} A_i E_i(x,y) \quad (1)$$

wherein c and k represent the coefficients of the conical component of the surface (curvature and conicity, respectively), N is the number of the polynominal coefficients in the series, $A_i$ is the coefficient of the polynominal $i$-$^{th}$ $E_i$ term in the form of product of the sequences of powers of x and y (namely x, y, $x^2y^2$, xy, $x^2y$, $xy^2$ and so on).

4. Optical system according to claim 3, wherein said polynominal aspherical output surface with a non-rotational symmetry is described by the following equation:

$$z(r) = \frac{cr^2}{1+\sqrt{1-(1+k)c^2r^2}} + \sum_{i=1}^{N} A_i E_i(x,y) \quad (1)$$

wherein c and k represent the coefficients of the conical component of the surface (curvature and conicity, respectively), N is the number of the polynominal coefficients in the series, $A_i$ is the coefficient of the polynominal $i$-$^{th}$ $E_i$ term in the form of product of the sequences of powers of x and y (namely x, y, $x^2y^2$, xy, $x^2y$, $xy^2$ and so on).

5. Optical system according to claim 1, wherein said focusing system has an outlet pupil coincident with the inlet pupil of said light guide.

6. Optical system according to claim 5, wherein in correspondence with said outlet pupil of the focusing system a diaphragm, with an opening substantially like the extension of such outlet pupil, is arranged, so as to reduce the parasitic light rays and the aberrations.

7. Optical system according to claim 1, in which the reflecting surfaces of said light guide are coated with a metal reflecting layer.

8. Optical system according to claim 7, in which the reflecting surfaces of said light guide are coated with a metal reflecting layer comprising Ag, Al, or Cr.

9. Optical system according to claim 1, in which at least one of the reflecting surfaces of said light guide is coated by at least a partly reflecting film consisting in multiple superimposed layers of dielectric material.

10. Optical system according to claim 9, wherein said multilayer film of dielectric material is suitable for substantially decreasing the adsorption losses.

11. Optical system according to claim 10, wherein the multilayer is deposited so as to control its own reflectance as a function of the angle of incidence, while maintaining it at optimal values for the angles of incidence characteristic of the rays associated to the image which propagates in light guide, and, very low values for the rays associated with the background, with a consequent optimization of the see-through features and a reduction of the spurious images.

12. Optical system according to claim 9, in which at least one of the reflecting surfaces of said light guide is coated by at least a partly reflecting film consisting in multiple superimposed layers of dielectric material comprising $MgF_2$, SiO, $SiO_2$, $TiO_2$, $Ta_2O_5$, or $Al_2O_3$.

13. Optical system according to claim 1, wherein the system includes a substantially prism-shaped optical element, placed in contact with the second of said reflecting surfaces, said optical element showing an internal surface with a profile coincident with said second reflecting surface of the light guide and an external surface such that, once the internal surface has been stuck to the second reflecting surface of the guide, said optical element completes the profile of the external plane face of the light guide.

14. Optical system according to claim 13, wherein said optical element ensures the see-through features of the optical system 1.

* * * * *